United States Patent [19]

Thayer

[11] Patent Number: 5,412,461
[45] Date of Patent: May 2, 1995

[54] FRICTION LOAD INSENSITIVE MOUNTING FOR BLADE

[75] Inventor: Bruce E. Thayer, Webster, N.Y.

[73] Assignee: Xerox Corporation, Stamford, Conn.

[21] Appl. No.: 238,776

[22] Filed: May 5, 1994

[51] Int. Cl.⁶ ............................................. G03G 21/00
[52] U.S. Cl. .................................... 355/299; 15/1.51; 15/256.5; 198/494; 198/497; 355/296
[58] Field of Search ...................... 355/296, 299, 301; 118/652; 15/1.51, 256.5, 256.51, 256.52; 198/494, 496, 497

[56] References Cited

U.S. PATENT DOCUMENTS

| | | | |
|---|---|---|---|
| 4,519,699 | 5/1985 | Mayer et al. | 355/301 X |
| 4,595,280 | 6/1986 | Tanzawa et al. | 355/299 |
| 4,919,756 | 4/1990 | Sawdai | 15/256.5 X |
| 5,040,030 | 8/1991 | Ziegelmuller | 355/299 |
| 5,084,739 | 1/1992 | Kalyandurg et al. | 355/299 |

FOREIGN PATENT DOCUMENTS

| | | | |
|---|---|---|---|
| 60-52885 | 3/1985 | Japan | 355/299 |
| 4-303879 | 10/1992 | Japan | 355/299 |

*Primary Examiner*—William J. Royer
*Attorney, Agent, or Firm*—T. L. Fair

[57] ABSTRACT

An apparatus in which a photoreceptor cleaning blade is mounted to an extension of the coupler link of a four bar linkage. A torsion spring is positioned at the pivot of the crank link to create the torque on the crank link. A weight or solenoid can also be used to create the torque on the crank link. This torque supplies the force to the mounted cleaning blade. The instantaneous center of rotation is a virtual pivot point which is located on the photoreceptor tangent plane. The linkage reaction forces and the blade friction load all pass through the virtual pivot point leaving the blade load a function of the torque on the crank link. In machines where the cleaning blade is located on a long span of a belt photoreceptor this offers the advantage of blade loading insensitivity to friction without trapping the photoreceptor inside pivot bearings, 19 Claims, 2 Drawing Sheets

FRICTION LOAD INSENSITIVE MOUNTING FOR BLADE

BACKGROUND OF THE INVENTION

This invention relates generally to a cleaning apparatus, and more particularly concerns a mounting device for a blade cleaner.

In the process of electrophotographic printing, a photoconductive surface is charged to a substantially uniform potential. The photoconductive surface is imagewise exposed to record an electrostatic latent image corresponding to the informational areas of an original document being reproduced. This records an electrostatic latent image on the photoconductive surface corresponding to the informational areas contained within the original document. Thereafter, a developer material is transported into contact with the electrostatic latent image. Toner particles are attracted from the carrier granules of the developer material onto the latent image. The resultant toner powder image is then transferred from the photoconductive surface to a sheet of support material and permanently affixed thereto.

This process is well known and useful for light lens copying from an original and printing applications from electronically generated or stored originals, and in ionography.

In a reproduction process of the type as described above, it is inevitable that some residual toner will remain on the photoconductive surface after the toner image has been transferred to the sheet of support material (e.g. paper). It has been found that with such a process that the forces holding some of the toner particles to the imaging surface are stronger than the transfer forces and, therefore, some of the particles remain on the surface after transfer of the toner image. In addition to the residual toner, other particles, such as paper debris (i.e. Kaolin, fibers, clay), (Hereinafter, the term "residual particles" encompasses residual toner and other residual particles remaining after image transfer.) The residual particles adhere firmly to the surface and must be removed prior to the next printing cycle to avoid its interfering with recording a new latent image thereon.

Various methods and apparatus may be used for removing residual particles from the photoconductive imaging surface. Hereinbefore, a cleaning brush, a cleaning web, and a cleaning blade have been used. Both cleaning brushes and cleaning webs operate by wiping the surface so as to affect transfer of the residual particles from the imaging surface thereon. After prolonged usage, however, both of these types of cleaning devices become contaminated with toner and must be replaced. This requires discarding the dirty cleaning devices. In high-speed machines this practice has proven not only to be wasteful but also expensive.

The shortcomings of the brush and web made way for another now prevalent form of cleaning known and disclosed in the art—blade cleaning. Blade cleaning involves a blade, normally made of a rubberlike material (e.g. polyurethane) which is dragged or wiped across the surface to remove the residual particles from the surface. Blade cleaning is a highly desirable method, compared to other methods, for removing residual particles due to its simple, inexpensive structure. However, mounting the blade for cleaning contact over a long span of a photoreceptor belt can be problematic.

It has been attempted in the past to mount blade cleaners such that a line tangent to the photoreceptor at the tip contact intersects the blade pivot point. This causes the moment created by the blade friction load to be zero and thus prevents any change in blade normal load due to the friction load. While this is usually fairly easy to accomplish on a drum photoreceptor or, on a belt photoreceptor near a corner roller (as in the Xerox 1065), it becomes difficult to locate the pivot point over a long span of flat belt photoreceptor in the photoreceptor tangent plane.

The following disclosures may be relevant to various aspects of the present invention and may be briefly summarized as follows:

U.S. Pat. No. 5,084,739 to Kalyandurg et al. discloses a cleaning apparatus which is loadable against a surface to be cleaned having a L-shaped self-loading blade, a holding member, and supporting members including a retaining pin and a spring member. The cleaning blade includes a base section and a cleaning section which can move relative to each other from unloaded positions to loaded positions.

U.S. Pat. No. 5,040,030 to Ziegelmuller discloses a cleaning blade for precise loading and sealing against an electrostatographic surface to be cleaned.

SUMMARY OF INVENTION

Briefly stated, and in accordance with one aspect of the present invention, there is provided an apparatus for cleaning particles from a surface. This apparatus comprises a cleaning device; and a mechanism that pivotably supports the cleaning device. The mechanism has a virtual pivot point, in a plane, extending in a direction tangential to the surface and an actual pivot point spaced from the plane.

Pursuant to another aspect of the present invention, there is provided a device for mounting a cleaning unit on a printing machine to clean particles from an imaging surface. This mounting device comprises a mechanism that pivotally supports the cleaning unit. The mechanism has a virtual pivot point, in a plane extending in a direction tangential to the imaging surface and an actual pivot point spaced from the plane.

BRIEF DESCRIPTION OF THE DRAWINGS

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Reference is now made to the drawings where the showings are for the purpose of illustrating a preferred embodiment of the invention and not for limiting same.

Figure 1:
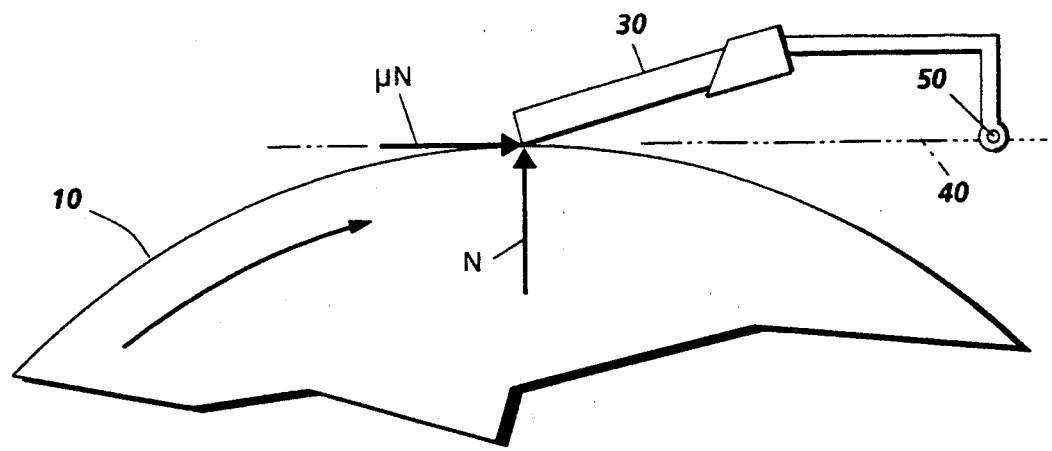
FIG. 1 is a prior art schematic of a blade pivot location on a drum.
Figure 2:
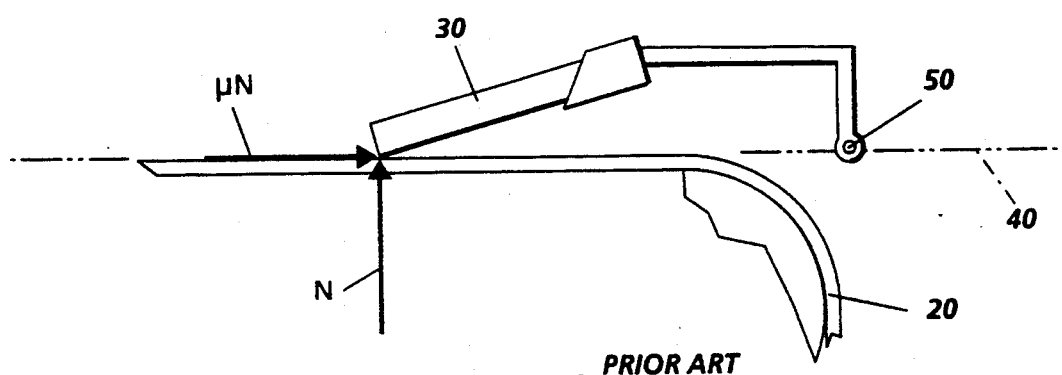
FIG. 2 is a prior art schematic of a blade pivot location on a belt photoreceptor near a corner roller.

Reference is made to the prior art, FIGS. 1 and 2, showing the blade pivot location on a drum 10 (see FIG. 1) and a belt photoreceptor 20 near a corner roller (see FIG. 2). Attempts to mount blade cleaners such that a line tangent 40 to the photoreceptor 10, 20 at the tip contact intersects the blade pivot point 50, causes the moment created by the blade friction load to be zero and thus prevents any change in blade normal load, N due to the friction load, $\mu N$. This is usually fairly easy to accomplish on a drum photoreceptor, as shown in FIG. 1 or, on a belt photoreceptor near a corner roller (as in the Xerox 1065), as shown in FIG. 2.

Figure 3:
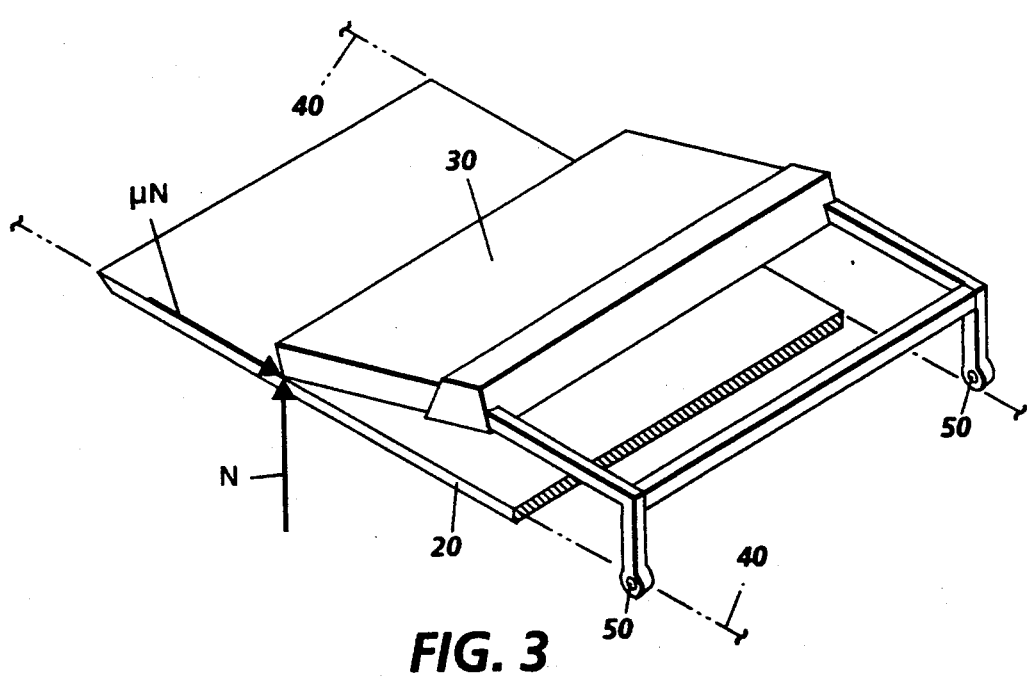
FIG. 3 is a schematic of a blade pivot location over a long span of a belt photoreceptor that causes interference during belt removal.

Reference is made to the FIG. 3 which shows a machine architecture in which the blade 30 is located over a long span of flat belt photoreceptor 20. However, it becomes difficult to locate the pivot 50 in the photoreceptor tangent plane. A solution to this problem would be to mount the blade pivot points (e.g. bearings) beyond the edges of the width of the photoreceptor belt 20. This solves the pivot location problem, by allowing the pivot to be located on a line tangent to the photoreceptor. However, it becomes more difficult to remove the photoreceptor belt 20 from the machine because the apparatus mounting the blade interferes with the removal of the belt 20.

Figure 4:
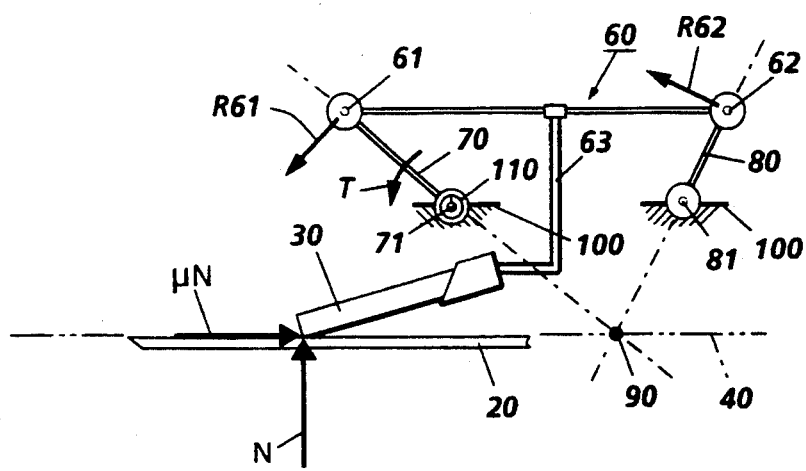
FIG. 4 is a schematic of a blade mounting arrangement of the present invention.

Reference is now made to FIG. 4, which shows the present invention of a new blade mounting arrangement. The blade mounting arrangement includes four bars: the crank 70, the coupler 60, the follower 80, and the machine frame is mounted to ground links 100, which is the fourth bar. Each of these bars are pivotally connected to one another. The coupler 60 is attached to the crank link 70 by a pivot 61 on one end and to the follower link 80 by a pivot 62 on it's opposite end. The forces on the coupler pivots are shown by arrows $R_{61}$ and $R_{62}$. The crank pivot 71 and the follower pivot 81 connect the crank link 70 and the follower link 80, respectively to the ground links 100. The crank pivot 71 and follower pivot 81 are located a sufficient distance away from the photoreceptor to allow easy removal of the photoreceptor belt 20. The blade 30 is mounted to the coupler extension 63 of a four bar linkage. The crank link 70 of the four bar mechanism is loaded by a spring 110 (e.g. torsion spring, tension spring, compression spring) to supply the force which creates the blade normal load, N. The follower link 80 and the crank link 70 are located such that, when the blade 30 is loaded against the photoreceptor 20, lines passing through the crank link 70 and follower link 80 axes intersect on the tangent plane 40 of the photoreceptor 20. The point where these lines intersect the tangent plane 40 of the photoreceptor 20 is called the instantaneous center of rotation or the virtual pivot point 90. The advantages of this mounting arrangement,are that it is not affected by the friction load, $\mu N$, of the blade 30 and, it can be used on large spans of flat belt photoreceptors without interfering with the photoreceptor belt 20 removal. This mounting arrangement is also adaptable for use with a cleaning brush.

Figure 5:
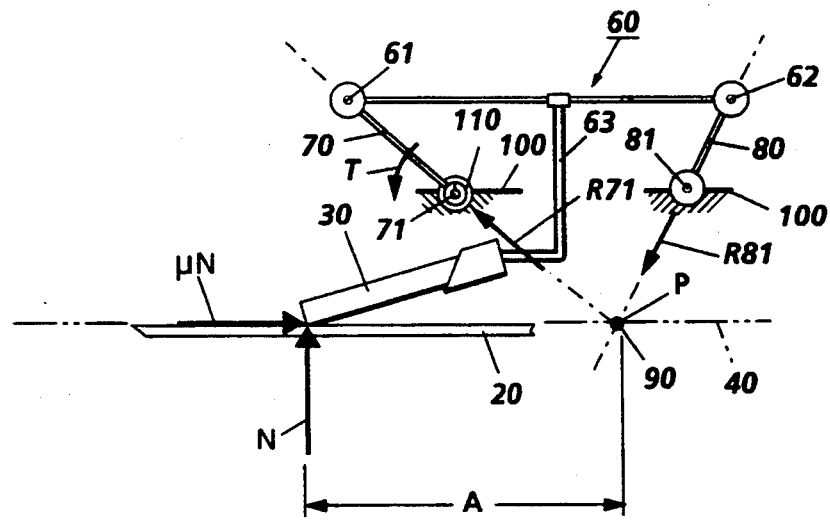
FIG. 5 is a schematic of the summation of the moments of the present invention shown in FIG. 4.

Referring now to FIG. 5, which shows a schematic of the summation of the moments of the present invention shown in FIG. 4. The blade mounting arrangement shown in FIG. 5 provides an unaffected normal load, N, by the friction load, $\mu N$, when a torque, T, is applied to the crank link 70. This is determined by a summation of the moments, $M_p$, about the virtual pivot point 90. The summation of the moments, $M_p$, in FIG. 5 are calculated using the following equation:

$$\Sigma M_p = (NA) - T + (0 \times \mu N) + (0 \times R_{71}) + (0 \times R_{81}) = 0$$

$$(NA) - T = 0$$

$$N = T/A$$

In the equation above, N is the normal load (i.e. the weight or force on the blade tip contacting the photoreceptor surface), and A is the distance between the normal load, N, and the virtual pivot point, 90. T is the torque applied by the spring 110 to the crank link 70. A weight or a solenoid are other ways the torque (T) can be applied to the crank link. The forces at ground are shown by arrows $R_{71}$ and $R_{81}$. The reaction forces, $R_{71}$ and $R_{81}$, pass through the virtual pivot point 90, thus, the moment arm value in the equation is zero for both $R_{71}$ and $R_{81}$. Hence, the moments due to $R_{71}$ and $R_{81}$ are equal to zero. The frictional force, $\mu N$, also has a value of zero for the moment arm about the pivot point, which yields a blade friction load moment of zero due to the blade mounting arrangement of the present invention. Therefore, as can be seen by the calculation above, the normal force, N, about the virtual pivot point 90 is a function of torque over distance. It is not a function of the friction load, $\mu N$. Thus, the blade normal load, N, is not changed by the blade friction load, $\mu N$, in the present invention when the blade is mounted over a long span of a flat belt photoreceptor 20 in the photoreceptor tangent plane 40. The blade mounting arrangement lends itself easily to retraction from the photoreceptor. The blade 30 can be easily mounted to the coupler link and perhaps result in easier replacement of the cleaning blade.

Figure 6:
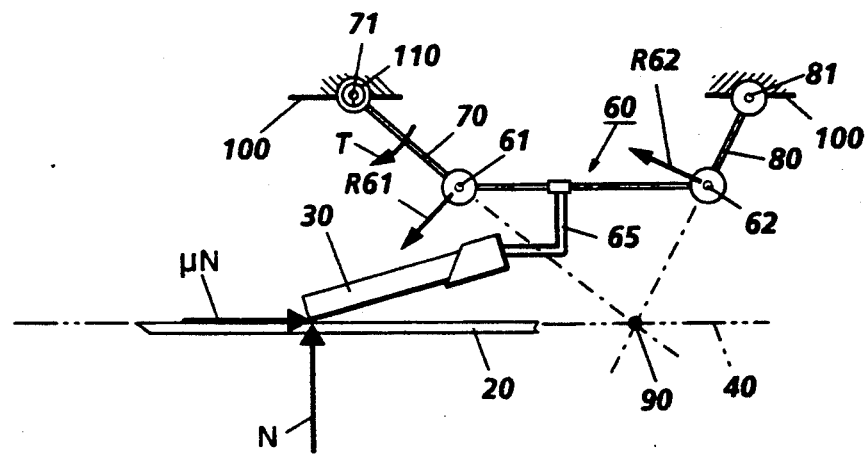
FIG. 6 is a schematic of an alternate embodiment of the present invention.

The four bar linkage apparatus need not be complicated and could be oriented in many different configurations to fit machine space requirements. An alternate configuration is shown in FIG. 6. The embodiment has the crank link 70 and the follower link 80 located above the coupler link 60. However, this configuration operates in the same manner as the embodiment shown in FIGS. 4 and 5. The benefit of this embodiment is that by placing the crank link 70 and the follower link 80 above the coupler link 60, potential interference of the links with the cleaning blade 30 is avoided. The cleaning blade holder is attached to the coupler link 60 by a coupler extension 65.

In recapitulation, the present invention provides a photoreceptor cleaning blade mounted to the extension of the coupler link of a four bar linkage and a spring attached to the pivot of the crank link. The crank link of the four bar mechanism is loaded by a spring (e.g. torsion spring, tension spring, compression spring), weight, or a solenoid to supply the force which creates the blade normal load, N. The follower link and the crank link are located such that, when the blade is loaded against the photoreceptor, lines passing through the crank link and follower link axes intersect on the tangent plane of the photoreceptor. The point where these lines intersect the tangent plane of the photoreceptor is called the instantaneous center of rotation or the virtual pivot point. The advantages of this mounting arrangement, are that it is not affected by the friction load, $\mu N$, of the blade and, it can be used on large spans of flat belt photoreceptors without interfering with the photoreceptor belt removal. This mounting arrangement is also adaptable for use with a cleaning brush.

It is, therefore, apparent that there has been provided in accordance with the present invention, a blade mounting arrangement that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

It is claimed:

1. An apparatus for cleaning particles from a surface, comprising:
   a cleaning device; and
   a mechanism supporting pivotably said cleaning device with said mechanism having a virtual pivot point in a plane extending in a direction tangential to the surface and an actual pivot point spaced from the plane.

2. An apparatus as recited in claim 1, wherein said mechanism comprises:
   a multibar linkage with each bar of said multibar linkage being pivotably connected to another bar thereof; and
   an extension bar having a first end thereof attached to one bar of said multibar linkage with a second end of said extension bar being attached to said cleaning device.

3. An apparatus as recited in claim 2, wherein said cleaning device comprises a blade having one end attached to said extension bar.

4. An apparatus as recited in claim 3, wherein said multibar linkage comprises a four bar linkage.

5. An apparatus as recited in claim 4, wherein said four bar linkage comprises:
   a ground link, having a first ground link section and a second ground link section;
   a crank link having a crank pivot on one end, said crank link being attached to said first ground link section at said crank pivot;
   a follower link having a follower pivot, said follower link being attached to said second ground link section at said follower pivot; and
   a coupler link, having a coupler pivot on each end, said coupler link being attached on one end, at one coupler pivot, to said crank link and said coupler link being attached on the opposite end, at another coupler pivot, to said follower link.

6. An apparatus as recited in claim 5, wherein said second end of said extension bar is attached to said coupler link between said crank link and said follower link.

7. An apparatus as recited in claim 6, wherein said follower link and said crank link are located so that lines passing through their axes intersecting the plane to define the virtual pivot point.

8. An apparatus as recited in claim 7, further comprising means for applying a torque about said crank link.

9. An apparatus as recited in claim 8, wherein said torque applying means comprises a spring.

10. An apparatus as recited in claim 9, wherein said crank pivot including said spring thereabout.

11. A device for mounting a cleaning unit on a printing machine to clean particles from an imaging surface, comprising a mechanism supporting pivotably the cleaning unit with said mechanism having a virtual pivot point in a plane extending in a direction tangential to the imaging surface and an actual pivot point spaced from the plane.

12. A device as recited in claim 11, wherein said mechanism comprises:
   a multibar linkage with each bar of said multibar linkage being pivotably connected to another bar thereof; and
   an extension bar having a first end thereof attached to one bar of said multibar linkage with a second end of said extension bar being attached to the cleaning unit.

13. A device as recited in claim 12, wherein said multibar linkage comprises a four bar linkage.

14. A device as recited in claim 13, wherein said four bar linkage comprises:
   a ground link, having a first ground link section and a second ground link section;
   a crank link having a crank pivot on one end, said crank link being attached to said first ground link section at said crank pivot;
   a follower link having a follower pivot, said follower link being attached to said second ground link section at said follower pivot; and
   a coupler link, having a coupler pivot on each end, said coupler link being attached on one end, at one coupler pivot, to said crank link and said coupler link being attached on the opposite end, at another coupler pivot, to said follower link.

15. A device as recited in claim 14, wherein the cleaning unit comprises:
   a blade holder; and
   a blade partially inserted into said blade holder with an end extending outwardly therefrom and being pressed into contact with the imaging surface, said blade holder being connected to said second end of said extension bar.

16. A device as recited in claim 15, wherein said extension bar is attached to said coupler link between said crank link and said follower link.

17. A device as recited in claim 16, wherein said blade is movable between a first position and a second position.

18. A device as recited in claim 17, wherein said first position urges said blade into contact with the imaging surface.

19. A device as recited in claim 18, wherein said second position moves said blade away from contact with the imaging surface.

* * * * *